Inventor
CYRIL ROBERT LEVIS
By Young & Thompson
Attorneys

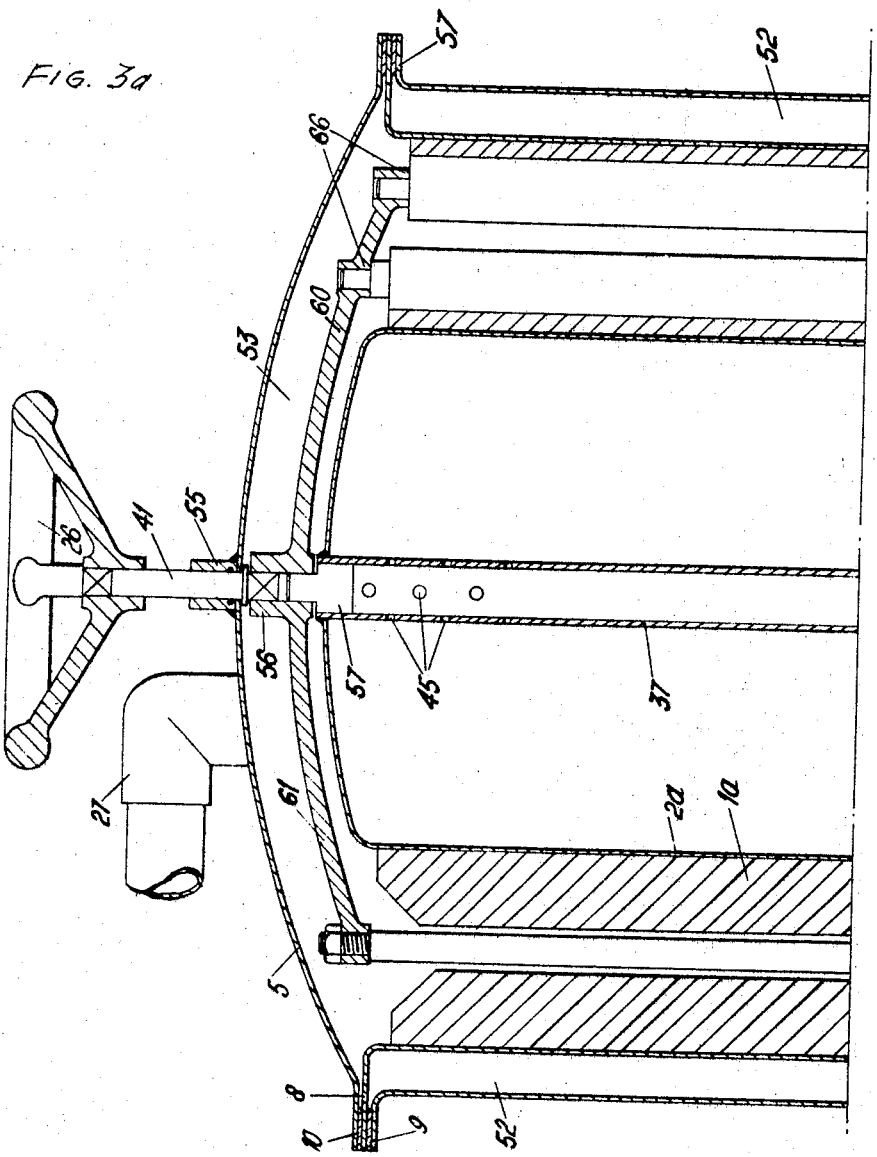

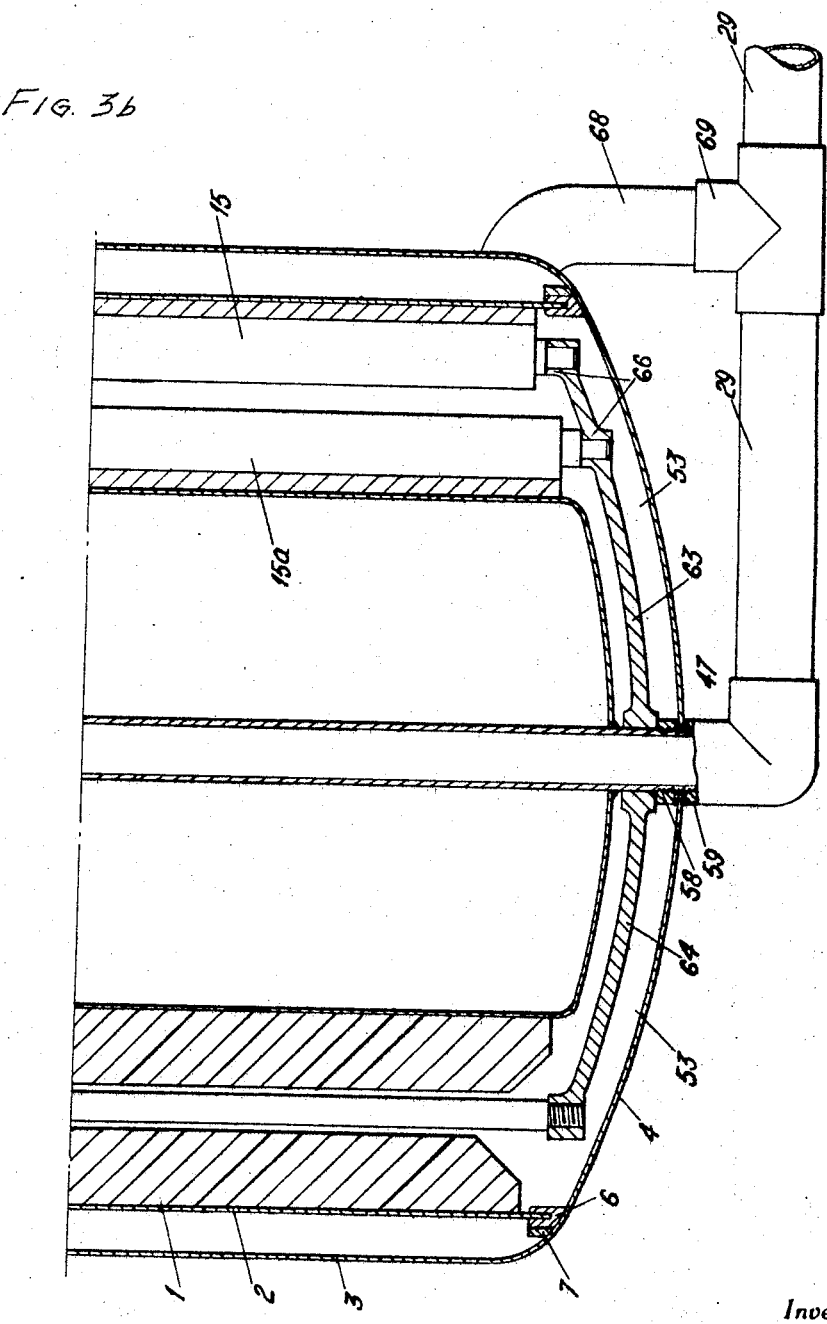

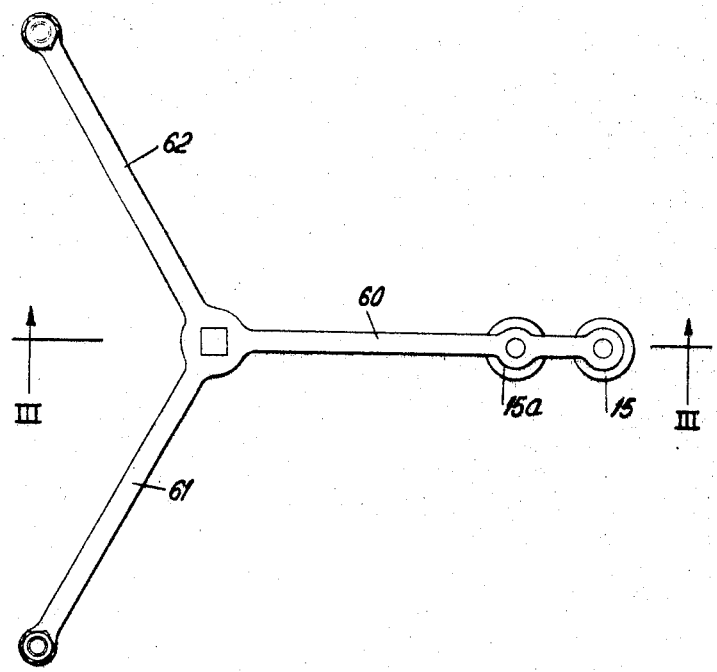

United States Patent Office 3,428,181
Patented Feb. 18, 1969

3,428,181
YIELDABLE FILTER ELEMENT CLEANING
Cyril R. Levis, 1 Pope's Road, Cork, Ireland
Filed Jan. 28, 1966, Ser. No. 523,721
Claims priority, application Ireland, Feb. 2, 1965,
123/65; June 24, 1965, 644/65
U.S. Cl. 210—333      8 Claims
Int. Cl. B01d 25/38, 27/12

ABSTRACT OF THE DISCLOSURE

A fluid filter comprises a casing in which is mounted a cylindrical foraminous screen lined with yieldable filter material. Means, such as a roller, are provided to compress the filter material against the screen so as to facilitate removal of impurities when backwashing.

---

Figure 1:
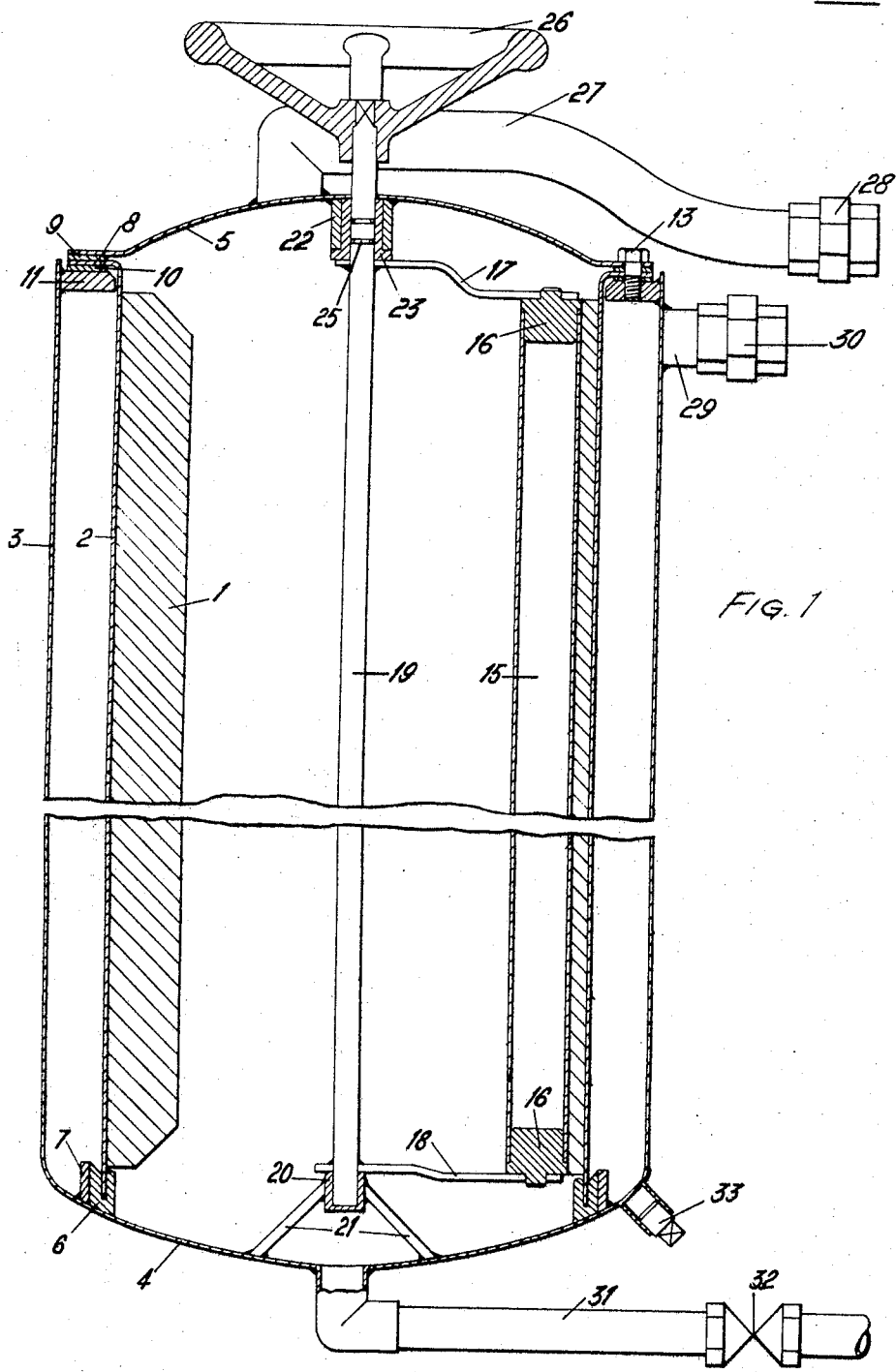

The present invention concerns improvements in and relating to fluid filters, and is particularly, though not exclusively, concerned with filters for use in water installations.

In a known type of water filter, a cylindrical vessel contains a layer of graded shingle surmounted by a layer of sand, a space being provided above the sand within which to trap impurities which it is desired to extract from water fed downwards through the filter. In said known filter a coagulant is mixed with the impure water as it passes into the filter vessel through an inlet, the coagulant forming a "floc" in the space above the sand and extracting the impurities as the water is forced downwards under pressure through the sand and shingle through a filtered water outlet to a delivery pipe which conveys the filtered water to its required destination.

When the filtering surface becomes laden with extracted impurities, the filter is cleaned by closing the inlet, opening an impurity outlet and pumping water under pressure into the filter through the filtered water outlet, the water under pressure being forced through the shingle and sand, passing out of the vessel through the impurity outlet, and conveying with it the impurities trapped in the vessel. This process, commonly called "backwashing," often results in loss of sand through the impurity outlet, with consequent detriment to the efficiency of the filter.

Apart from the obvious disadvantages described above, the filtering surface of the known filter is limited to the cross-sectional area of the cylindrical vessel.

An object of the present invention is to substantially overcome the disadvantages mentioned above by providing a new and improved filter.

According to the invention, there is provided a fluid filter comprising a hollow body having a permeable wall of homogeneous filter material, the fluid to be filtered being adapted to be fed radially through the wall of the hollow body. Preferably, the hollow body is yieldable and overlies a foraminous screen of non-yieldable material.

Advantageously, the permeable wall is acted upon by means which compresses the latter against the foraminous screen over a restricted area which changes progressively, said means preferably taking the form of a roller which compresses a longitudinal section of the permeable yieldable wall against the foraminnous screen and is mounted parallel to the axis of the hollow body for rotation around and in compressing engagement with the permeable wall. When liquid (normally water) is being pumped through the filter in reverse to clean the latter in the operation of backwashing, the roller is rotated to squeeze the filter material against the foraminous screen and thereby assist the cleaning action.

In one preferred embodiment of the invention the hollow body is cylindrical and forms the inner lining of a foraminous cylindrical screen, the liquid to be filtered being adapted to be fed axially into the interior of the cylindrical filter body and radially outwards through the wall thereof, the cylindrical body and screen being arranged within an outer vessel the substantially cylindrical wall of which is spaced from the filter body to provide an annular space between the cylindrical screen and outer vessel, the latter having in one end thereof an inlet giving access to the interior of the cylindrical body, an outlet for filtered fluid being provided in the vessel wall encircling said annular space.

For the purpose of squeezing the permeable wall when "backwashing," a rigid roller is rotatably mounted longitudinally within the filter body.

In a second preferred embodiment of the invention the filter body is applied to the external circumference of a cylindrical foraminous non-yieldable sleeve which is closed at both ends and supported axially within an outer substantially cylindrical vessel, for example upon a hollow rod mounted axially, so as to leave an annular chamber between the sleeve and vessel, the rod having perforations on the portion thereof which lies within the sleeve and one end thereof passing out of the vessel and serving as an outlet for fluid fed through the filter, an inlet to the filter being provided in the vessel wall.

The cleaning roller may be rotatably supported upon radial arms attached to a shaft which passes axially into the filter vessel through a gland in which it is rotatable by the aid of a hand wheel or the like mounted upon the end of the shaft projecting from the top of the filter vessel. Alternatively, however, the filter body may itself be rotatably mounted within the outer casing, the cleaning roller being journalled in the outer wall or ends of the vessel. In this construction the filter body is rotated during backwashing by the aid of a handle connected to said body and extending axially through a gland to the exterior of the vessel.

In a third preferred construction the filter comprises an outer vessel, preferably cylindrical in form having a cylindrical filter mounted therein and comprising a substantially rigid cylindrical foraminous screen having a layer of porous yieldable material such as foamed plastic applied externally to said cylindrical screen, and interposed between the latter and the outer wall of the vessel, but spaced therefrom, a second substantially rigid cylindrical foraminous screen which is lined internally with a layer of porous yieldable material, preferably foamed plastic. In this construction the liquid to be filtered is normally fed into the annular chamber formed between the two filter bodies arranged one within the other, and the filtered liquid is led away from the interior of the inner cylindrical filter body and also from the annular space between the outer annular filter body and the outer wall of the vessel. The cleaning of both filter bodies is affected simultaneously by backwashing with the aid of one or more pairs of rollers carried by spider arms rotatably mounted upon a tube which passes axially through the vessel and supports the inner cylindrical screen, and also serves as an outlet pipe. The rollers extend longitudinally in the annular chamber between the two filter bodies, and press respectively against the foamed plastic layers thereof. The spider may be rotated by the aid of a handle connected thereto and passing through a gland to the exterior of the vessel, at least one roller contacting and compressing the plastic layer of the inner filter body, while another of the rollers similarly contacts and compresses the foamed plastic of the outer filter body.

Instead of employing pairs of rollers each rotatably mounted and acting respectively upon the inner and outer filter bodies, the construction could be carried out employing a single roller which may be rotated when desired in the annular chamber between the inner and outer filter bodies, to compress both filter bodies simultaneously during backwashing, but in this case it would be necessary to mount the inner cylindrical filter so that it can rotate freely within the filter casing, the inner filter, cleaning roller and outer filter thus being relatively movable in the manner of epicyclic gear elements.

Figure 2:
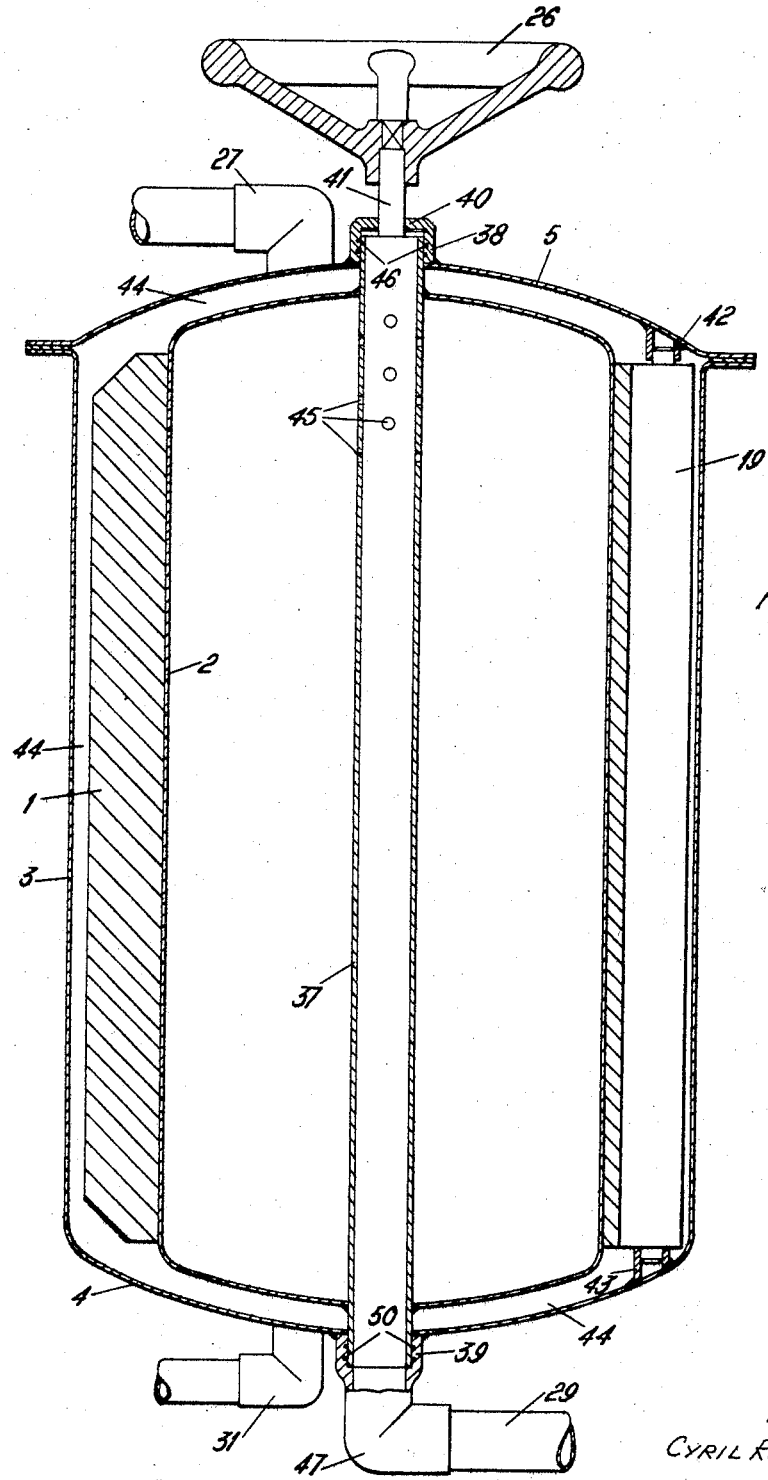

The invention will hereafter be described more particularly with reference to the accompanying drawings, which illustrate, by way of example, preferred constructions of filters for use in water installations, and wherein:

FIGURE 1 is a sectional elevation of the form of filter according to the invention, FIGURE 2 is a sectional elevation of a second form of filter, FIGURES 3a and 3b are sectional elevations of a third form of filter taken on the lines III—III of FIGURE 4, and FIGURE 4 is a plan of the radial arms and rollers shown partly in FIGURE 3.

Referring to the drawings, in which similar parts are indicated by the same reference numerals, the first embodiment shown in FIGURE 1 comprises a hollow cylindrical body 1 of foamed plastic filter material lining the interior of a foraminous cylindrical metal screen 2 located axially within a cylindrical vessel having a wall 3, a bottom portion 4 forming an integral part of the vessel, and a detachable cover plate 5. One end of the screen 2 is mounted in a circular moulded neoprene seal 6 anchored within a locating ring 7 welded to the interior of the bottom portion 4, while the other end of the screen 2 has a flanged extremity 8 secured between a pair of fluid tight rings 9 and 10 which are clamped between a locating ring 11 and the detachable plate 5 by screws 13, only one of which is shown in FIGURE 1.

Pressing against a longitudinal section of the filter material 1 is a roller 15 rotatably mounted, through the intermediary of spigots 16, in the extremities of a pair of radial arms 17 and 18 rigidly mounted adjacent opposite ends of a spindle 19 axially mounted for rotation within the vessel wall 3. One end of the spindle 19 is rotatable in a bushing 20 supported above the vessel bottom portion 4 by stays 21 welded to the interior of the vessel bottom 4, while the other end of the spindle 19 passes out of the vessel 3 through an aperture in the top plate 5. Welded to the latter is a boss 22 between which and the radial arm 17 is a turnol bushing 23 in which the spindle 19 is rotatable, fluid tight rings 25 being provided in the turnol bushing 23 to prevent leakage of fluid through the latter. The spindle 19 has a detachable handle 26 mounted on the extremity thereof which projects from the cover plate 5.

An inlet pipe 27 giving access to the interior of the filter is provided in the cover plate 5 and the pipe 27 has a coupling member 28 by means of which the pipe 27 may be connected to the source of fluid to be filtered. An outlet pipe 29 is provided in the cylindrical wall 3 and has a coupling member 30 by which the pipe 29 may be connected to a delivery pipe (not shown). A waste pipe 31, which is normally closed by a cock 32, is connected to an outlet from the interior of the filter and a drain plug 33, normally closed, is arranged in the lower extremity of the annular space between the screen 2 and the wall of the vessel 3.

In operation fluid to be filtered is fed into the cylindrical interior of the filter through the inlet pipe 27 the cock 32 being closed. The fluid then passes radially outwards through the foamed plastic material 1 and the foraminous screen 2 and into the annular chamber between the latter and the vessel wall 3 from which it passes to the delivery pipe 22.

When it is desired to clean the filter, the cock 32 is opened and the inlet pipe 27 closed by means not shown. Water is then pumped into the filter through the outlet pipe 29 and passes from the annular chamber between the vessel wall and screen 2 through the latter and the foamed plastic filter body 1. Impurities and other waste matter accumulated in the interior of the filter body 1 and in the material of said body are carried from the interior of the filter body 1 through the waste pipe 31. During reverse pumping of water to clean the filter, the roller 15 is rotated around the inner circumference of the filter body 1 by actuation of the handle 26, the rotation being transmitted through the intermediary of the rod 19 and radial arms 17 and 18. The filter body 1 is squeezed by the roller 15 against the foraminous screen as indicated in FIGURE 1 so as to assist the cleaning action when backwashing the filter. It will be appreciated that rotation of the roller 19 during backwashing or reverse pumping results in the filter body 1 being continually compressed against the screen 2 when soaked and in practice it has been found that four or five revolutions of the roller 19 around the inner circumference of the cylindrical filter body 1 are sufficient to clean the filter satisfactorily.

In the embodiment shown in FIGURE 2, a filter body of foamed plastic material 1 is applied externally to a foraminous metal screen 2 which is closed at both ends and welded to a hollow rod 37 mounted axially for rotation within an outer vessel 3. The hollow rod 37 is supported in bushings 38 and 39 welded at opposite extremities exteriorly of the vessel 3. The bushing 38 is closed at one end by a collar 40 through which passes a shaft 41 operatively connected to the hollow rod 37 and carrying a handle 26. The handle 26 when actuated, transmits rotary motion through the shaft 41 and hollow rod 37, to the screen 2 and plastic material 1 so that the latter then rotates with respect to the outer vessel 3. Disposed between the hollow rod 37 and the bushing 38 are sealing rings 46. A roller 19 is journalled in the vessel wall 3 by the aid of bushings 42 and 43 welded to the interior of the vessel bottom 4 and cover plate 5 of the vessel. A pipe section 27 welded to the cover plate 5 which is detachably secured to the vessel 3 provides an inlet to the annular chamber 44 which is located between the screen 2 and vessel wall 3 the pipe section 27 having a coupling piece (not shown) by means of which it may be connected to a source of fluid to be filtered. The hollow rod 37 has perforations 45 giving access to the interior thereof and is terminated at its lower extremity, which passes out through the bottom 4 of the vessel 3, by a pipe junction member 47 integral with the bushing 39 and connected to an outlet pipe section 29. Sealing rings 40 are provided in the bushing 39 to prevent leakage through the bottom portion 4 of the vessel. The outlet pipe 29 serves as a filtered fluid delivery pipe. A waste outlet from the annular chamber 44 is provided through a pipe section 31 welded to the vessel bottom 4.

The operation of the filter shown in FIGURE 2 differs from that indicated in FIGURE 1 in that the fluid to be filtered is fed radially inwards through the foamed plastic material 1 from the annular chamber 44 and the filtered fluid is fed from the interior of the sleeve 2 through the perforations 45 and into the outlet pipe 29. In the embodiment being described the roller 19 is rotatable, with respect to the vessel wall 3 and with respect to the foraminous screen 2 which carries the foamed plastic material 1, upon actuation of the handle 26. During "backwashing" when water is being pumped in reverse through the filter, the plastic material is compressed between the screen 2 and roller 19 to assist in dislodging and extracting impurities in the filter material 1 as a result of successive filter operations.

FIGURE 3 illustrates a third practical construction of filter according to the invention. In this construction the filtering area may be double that provided by the constructions described with reference to FIGURES 1 and 2. Essentially the filter shown in FIGURE 3 is a combination of the features illustrated separately in FIGURES 1 and 2 and comprises an outer vessel having a wall 3, a bottom portion 4 and a detachable cover plate 5 which may for example be held in position by screw means of the kind described with reference to FIGURE 1. A cylindrical foraminous metal screen 2 is lined internally with a layer of foamed plastic constituting a hollow cylindrical body of filter material 1. One end of the screen 2 is located in a grooved circular moulded seal 6 anchored within a locating ring 7 welded to the interior of the vessel 3 while the other end of the screen 2 has a flanged extremity 8 held between a pair of fluid tight circular seals 9 and 10 which are clamped between the detachable cover plate 5 and a flanged extremity 51 of the vessel wall 3. An annular space 52 is thus provided between the metal screen 2 and the vessel wall 3. Interposed interiorly of the filter material 1 is a foraminous sleeve 2a closed at both ends and welded to a hollow rod 37 mounted axially within the filter vessel thereby providing an annular chamber 53 completely surrounding the foraminous screen 2a, which is lined externally with a layer of foamed plastic material constituting a hollow cylindrical body of filter material 1a and leaving a cylindrical space 54 between the opposed layers 1 and 1a of filter material.

Journalled for rotating in a bushing 55 welded externally of the cover plate 5 is a shaft 41 carrying a handle 26. Portion of the shaft 41 extends into the annular chamber 53 and is operatively connected to one end of a collar 56, the other end of the collar 56 being rotatable with respect to a spigot 57 on the interna lextremity of the hollow rod 37. The other extremity of the hollow rod 37 passes out of the vessel bottom 4 through nut 58 and into a pipe section 59 connected to a delivery pipe 29 by a coupling member 47.

The collar 56 has three spider arms 60, 61 and 62 (see FIGURE 4) disposed at angles of 120° to one another, three complementary spider arms being mounted on the adjacent lower extremity of the hollow rod 37 two of which complementary arms are shown marked 63 and 64. Between the arms 60 and 63 are disposed rollers 15 and 15a rotatably supported in bushings 66 while between the arms 61 and 64 is a nonrotatable balancing bar 67. A similar bar (not shown) is connected between the extremities of the arms 62 and the third spider arm (not shown) associated with the arms 63 and 64.

Welded to the cover plate 5 and giving access to the annular chamber 53 is an inlet pipe 27 adapted to be connected to a source of fluid to be filtered. An outlet from the interior of the screen 2a is provided by the hollow rod 37 which has perforations 45 therein by means of which filtered fluid may be conveyed to the delivery pipe 29, through the hollow rod 37 and pipe section 59. Filtered fluid in the annular chamber 52 is conveyed to the delivery pipe 29 by an outlet pipe 68 in the wall 3 of the outer vessel and the outlet pipe 68 is connected to the delivery pipe 29 by a coupling member 69.

In operation fluid to be filtered is fed into the annular chamber 53 through the inlet pipe 27. A quantity of the fluid passes through the plastic filter material 1 into the annular chamber 52 from which it is fed to the delivery pipe 29 by way of the outlet pipe 68. A further quantity of the fluid fed into the chamber 53 passes through the plastic filter material 1a into the interior of the foraminous screen 2a from which it passes into the delivery pipe 29 by way of the perforations 45, hollow rod 37 and outlet pipe 59.

When it is desired to backwash or clean the filter, water is pumped under pressure through the delivery pipe 29 and outlet pipe 68 and into the interior of the screen 2a and the annular chamber 52. From the interior of the screen 2a the cleansing water passes in reverse through the plastic filter material 1a and into the annular chamber 53 while the cleansing water from the annular chamber 52 passes in reverse through the plastic filter material 1 and into the annular chamber 53. During the backwashing operation the handle 26 is rotated and the rotary movement of the handle 26 is transmitted through the intermediary of the driven collar 56 and associated spider arms 60, 61 and 62 to the rollers 15 and 15a which simultaneously compress the plastic filter material 1 and 1a against the foraminous screens 2 and 2a respectively. The rollers 15 and 15a traverse the annular chamber 53 and progressively squeeze the entire circumference of the filter materials 1 and 1a to assist in dislodging accumulated dirt and other waste matter.

A coagulant may be fed through the inlet pipe 27 in any of the filters decribed to assist in extracting impurities from the fluid to be filtered. Alternatively the coagulant may be fed into the filter by a vent (not shown) normally closed.

Three-way valves (not shown) may be provided where necessary to reverse the flow during the backwashing operations. It will be evident that the details of construction of the fluid filter according to the invention may vary considerably without departing from the invention, the arrangement of the necessary inlet and outlet pipes and the three-way valve for reversing the flow to permit of "back-washing" when required, as well as the provision of bushings and glands where necessary to enable the rotatable internal parts of the filter to be moved by means extending through the outer casing of the appliance while maintaining a liquid-tight seal, being evident from the foregoing description.

I claim:

1. A fluid filter comprising a casing, a cylindrical rigid foraminous screen mounted in said casing, a hollow cylindrical body of permeable homogeneous yieldable filter material lining one side of said foraminous screen and providing an annular chamber between said cylindrical body and said casing, a first fluid conduit associated with said casing and communicating with the interior of said cylindrical body and a second fluid conduit associated with said casing and in communication with said annular chamber and means for compressing the wall of said hollow cylindrical body against the foraminous screen over a restricted area of said wall which area is progressively changeable.

2. A fluid filter according to claim 1, and means for moving said compressing means along the wall of said hollow cylindrical body thereby to compress a portion only of said yieldable filtering material and to cause the location of the compressed portion to move along said wall.

3. A fluid filter comprising a casing, a cylindrical rigid foraminous screen axially mounted in said casing but spaced from the wall thereof to provide an annular chamber between said cylindrical body and said casing, a hollow cylindrical body of permeable homogenous yieldable filter material lining the interior of said foraminous screen, an inlet in said casing communicating with the interior of said cylindrical body, an outlet in the casing wall communicating with the annular chamber, a roller in compressing engagement with a portion of said cylindrical body, said roller being rotatably mounted within said cylindrical body and rotatable about the axis thereof in engagement with said cylindrical body for compressing the wall of said cylindrical body against said foraminous screen over a restricted area which changes progressively, and means external to said casing for rotating said roller around said axis.

4. A fluid filter according to claim 3, wherein said roller is mounted upon radial arms carried by a shaft axially mounted for rotation within said cylindrical body, one end of said shaft extending to the exterior of said casing through a fluid tight bushing, and a handle mounted on said end for rotating said shaft.

5. A fluid filter comprising an internally cylindrical casing having a detachable cover plate, a hollow rod axially mounted within said casing, a cylindrical rigid foraminous screen having closed integral end plates supporting said screen upon said hollow rod, and providing an annular chamber between said foraminous screen and said casing, a hollow cylindrical body of permeable homogenous yieldable filter material lining exteriorly the foraminous wall of said screen, a fluid inlet in said detachable plate and communicating with said annular chamber, a fluid outlet in the end of said casing remote from said detchable cover plate and communicating with said hollow rod, the portion of said hollow rod which lies within said screen and adjacent the end of said screen remote from said outlet being perforated, a roller mounted in compressing surface contact with a limited area of said cylindrical body, means for relatively moving said externally lined screen and roller for progressively varying the area of compressing contact between said roller and body.

6. A fluid filter according to claim 5, wherein the roller is rotatably mounted in the wall of said casing with its axis parallel to the axis of said casing and means are provided for rotating the externally lined screen with respect to said roller.

7. A fluid filter comprising an internally cylindrical casing having a detachable cover plate, a foraminous cylindrical sleeve mounted within said casing coaxially therewith and providing an outer annular chamber between said sleeve and said casing, a first hollow cylinder of permeable homogeneous yieldable filter material lining the interior of said cylindrical sleeve, a hollow rod axially mounted in said casing within said hollow cylinder, a cylindrical rigid foraminous screen having closed integral end plates supporting said screen upon said hollow rod and providing an inner annular chamber between said foraminous screen and said first hollow cylinder, a second hollow cylinder of permeable homogeneous yieldable filter material lining exteriorly the foraminous wall of said screen, a fluid inlet in said detachable plate and communicating with said inner annular chamber, a first fluid outlet in the end of the casing remote from the detachable cover plate and communicating with said hollow rod, the portion of said hollow rod which lies within said screen and adjacent the end of said screen remote from said outlet being perforated, a second fluid outlet in the wall of the casing communicating with said outer cylindrical chamber, and roller means mounted in said inner annular chamber and arcuately movable therein in compressed contact with said first and second hollow cylinders for compressing same against said sleeve and screen respectively over progressively movable restricted areas thereof.

8. A fluid filter according to claim 7, wherein at least one pair of rollers is mounted for rotation between and in compressing engagement respectively with said first and second hollow cylinders of filter material, spider arms supporting said rollers upon said hollow rod and handle means for rotating said spider arms with respect to said sleeve and screen.

References Cited

UNITED STATES PATENTS

| | | | |
|---|---|---|---|
| 590,968 | 10/1897 | Davis | 210—342 X |
| 800,298 | 9/1905 | Heilrath | 210—414 |
| 2,598,322 | 5/1952 | Vokes | 210—342 X |
| 2,837,032 | 6/1958 | Horsting | 210—356 X |
| 2,966,960 | 1/1961 | Rochlin | 210—496 X |
| 3,087,582 | 4/1963 | Potter | 184—6 |

SAMIH N. ZAHARNA, *Primary Examiner.*

FRANK A. SPEAR, JR., *Assistant Examiner.*

U.S. Cl. X.R.

210—342, 351, 408, 414, 496